United States Patent [19]

Girieud

[11] Patent Number: 5,039,473
[45] Date of Patent: Aug. 13, 1991

[54] METHOD OF DETERMINING AND EVALUATING THE POWER RETURN CAPACITY OF A PRESSURIZED WATER NUCLEAR REACTOR

[75] Inventor: Patrick Girieud, Clamart, France
[73] Assignee: Framatome, Courbevoie, France
[21] Appl. No.: 333,661
[22] Filed: Apr. 5, 1989
[30] Foreign Application Priority Data
  Apr. 5, 1988 [FR] France .................. 8804440
[51] Int. Cl.$^5$ .......................................... G21C 7/36
[52] U.S. Cl. ........................ 376/216; 376/217; 376/219
[58] Field of Search ............... 376/216, 217, 218, 219; 364/550, 556

[56] References Cited

U.S. PATENT DOCUMENTS

| | | | |
|---|---|---|---|
| 4,075,059 | 2/1978 | Bruno | 376/216 |
| 4,077,836 | 3/1978 | Omori | 376/216 |
| 4,187,144 | 2/1980 | Mueller | 376/216 |
| 4,222,822 | 9/1980 | Mueller | 376/216 |
| 4,654,186 | 3/1987 | Leroy | 376/216 |

Primary Examiner—Donald P. Walsh
Attorney, Agent, or Firm—Pollock, Vande Sande & Priddy

[57] ABSTRACT

Method for determining a evaluating the capacity of a pressurized water nuclear reactor to return to power rapidly, consisting in calculating a pick-up power by applying the general formula:

$$Prip = Prel + \Delta P$$

in which Prip is the maximum pick-up power obtainable by acting on the control bars, Prel is the relative power delivered by the core, determined by the in-line measurement of the neutron flow emitted by the core and $\Delta P$ is the additional power resulting from the potential reactivity of the assembly of control bars of the reactor when this assembly passes from the observed insertion to the minimum insertion, P being calculated from the measured position of the power regulation clusters, involving the axial power distribution measured (C1 to C6) and the previously defined exhaustion of the core.

5 Claims, 1 Drawing Sheet

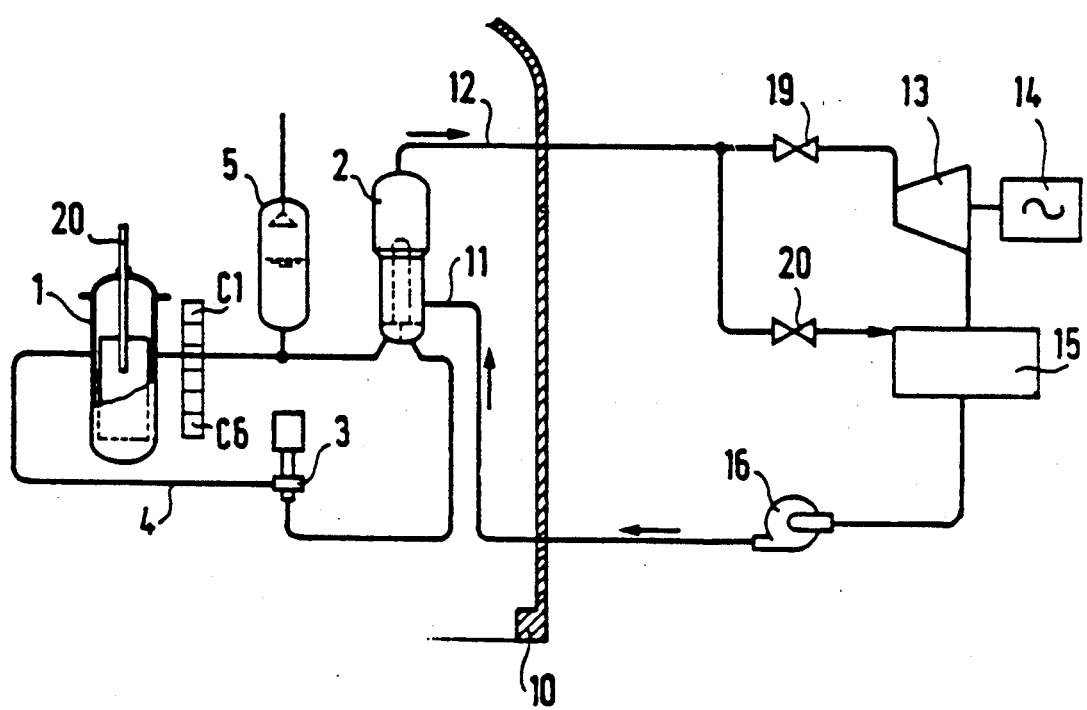

METHOD OF DETERMINING AND EVALUATING THE POWER RETURN CAPACITY OF A PRESSURIZED WATER NUCLEAR REACTOR

FIELD OF THE INVENTION

The present invention relates to the control of pressurized water electro-nuclear power stations and, more particularly, to determining and evaluating the capacity of such a power station to return rapidly to power. It relates more precisely to evaluating the reactivity available by adjusting the control bars when the power station is at an intermediate power level, for maintaining it at a sufficient level to permit rapid return to rated power.

BACKGROUND OF THE INVENTION

Pressurized water nuclear power stations are well known. Briefly, they comprise a reactor containing, in a vessel, fuel assemblies formed of fuel rods containing the fissile material ; in some of them mobile control rods or bars are inserted containing a neutron absorbing material. The control bars of a fuel assembly, controlled together, form a control cluster. The fuel assemblies are plunged into the pressurized water which flows through a primary circuit having several primary loops each including a primary pump and a steam generator. One of these loops also comprises a pressurizer maintaining the water pressure in the reactor. The pressurized water serves as moderating and heat-carrying fluid. Furthermore, it contains boron in solution, a neutron absorbing material serving, like the control clusters, for controlling the operation of the reactor.

The steam generators supply steam to a secondary circuit essentially comprising a turbine driving an alternator, a condenser and pumps.

The reactivity is a measurement of the evolution of the chain reaction in the core of the reactor. In this chain reaction, the neutrons produced by the fission of heavy nuclei, slowed down by the moderator which is the pressurized water of the primary circuit, absorbed to a greater or lesser extent by the control bars and the boron in solution, in their turn cause new fissions. The factor, called k, by which the number of fissions from one generation to the next is multiplied, is generally equal to 1. It may be temporarily greater than 1. The positive difference of k with respect to 1 is called reactivity. It is reckoned in pcm parts per hundred thousand). With a non zero reactivity, the chain reaction tends to increase. At other moments, the factor k may be less than 1, the reactivity is negative and we then speak of antireactivity. In this case, the reaction tends to die out.

The power of the reactor is adjusted by adjusting the reactivity, in fact by adjusting the position of the control bars and/or the boron concentration. To increase the power, a positive reactivity is provided. The reaction increases. The temperature increases in the reactor and the density of the water of the primary circuit decreases. Its moderating effect diminishes which is equivalent to providing antireactivity, which finally counterbalances the reactivity. The reactor is stabilized then at an increased power level. To reduce the power, the reverse operation is carried out.

The reactor may thus deliver the thermal power which is required of it, generally to cope with the electricity requirements of the grid to which the power station is coupled.

In the considerations which govern the choice between the two methods of controlling a nuclear reactor, using control bars or the boron level, it should first of all be mentioned that, though action on the control bars has immediate effects, the action by boron in solution is comparatively slower.

Moreover, the increase of the boron in solution concentration requires means for storing and injecting boric acid, whereas its decrease requires dilution means and, especially, means for processing and storing the effluents, means which are all the more considerable and expensive since recourse will be had more often and for longer periods to the action using boron in solution.

Thus, there is a tendency to use boron in solution only for correcting the long term effects on the reactivity of the operation of the reactor, namely essentially the xenon effect and the ageing of the fuel.

Controlling the thermal power delivered by the reactor to correspond to the requirements of the electric grid is thus preferably carried out using the control bars. But the insertion of the control bars prejudicially affects the axial distribution of the power produced in the reactor. Temperature inequalities result in the core of the reactor with, more particularly, an increased wear of the fuel at the hottest points and a localized production of xenon, which factors have a restrictive influence on the procedure for controlling the reactor and involve a correlative recourse to the action on the level of the boron in solution.

Now, with the increase in the participation of nuclear power stations in the total production of electricity it has become necessary for the nuclear power stations, initially used as basic power stations with a substantially constant production level, to be used as a function of the load, with a production level following a daily curve and even in pilot controlled mode, by remote adjustment, the production level conforming to an arbitrary curve, thus increasing the control actions, with the unfavorable consequences mentioned above. Thus, attempts have been made to find control methods using the control bars in which the distortion of the axial power distribution is reduced and its prejudicial effects limited.

Furthermore, in order to cope with the requirements of the grid, it may be necessary for the power station to have a certain capacity to return rapidly to power, when it is operating at intermediate power. This capacity can only be ensured if, at the intermediate powers, groups of control bars are sufficiently inserted. Thus, French patent No. 2,395,572 disclosed a method for driving a nuclear reactor in which, in order to control the reactivity effects due to the power variations, depending on the power required at the turbine only, groups are displaced formed of absorbing material clusters one at least of which has reduced antireactivity, so as to vary the power of the reactor, as well as a group, called group R, formed of very absorbing clusters, as a function of the difference existing at all times between the mean temperature of the core of the reactor and a reference temperature, which is a function of the required power level, the action on the concentration of the boron in solution serving for maintaining the group R within a certain range, in addition to correcting the long term reactivity effects.

The need for a rapid return to power is complied with in the control method of patent by means of the first control bar assembly whose position is defined by the power required at the turbine. The later French Patent No. 2,493,582 disclosed a method for controlling a nuclear reactor by the combined displacement, in the core of this reactor, of groups of control bars, so that the disturbances to the axial power distribution are always limited, which avoids having recourse to boron in solution, whose concentration is then adjusted only in order to compensate for the effects of the release of xenon and the ageing of the fuel rods.

In this control method of this patent the distinction between power control groups and temperature regulation group R disappears. The position of the power control groups is continually variable following a complex program.

In the control method of this patent the need for rapid return to power will on the other hand only be satisfied to the extent that the reactivity which the control bars present in the core may cause, at the time of their withdrawal, is sufficient to allow the desired return to power. The control of this available reactivity will for example serve to avoid extraction of the control bars under the effect of the regulation of the mean temperature, when the level of poisoning of the core by xenon increases, by acting on the boric acid concentration in the core.

SUMMARY OF THE INVENTION

The present invention therefore provides a method for determining the capacity of rapid return to power in pressurized water reactors which is suitable for the control method considered secondly and even, more generally, for any control method.

The method of determining and evaluating the capacity of a pressurized water nuclear reactor to return to power rapidly in accordance with the present invention consists in calculating a pick-up power by applying the general formula:

$$Prip = Prel + \Delta P$$

in which Prip is the maximum pick-up power obtainable by acting on the control bars, Prel is the relative power delivered by the core, determined by the in-line measurement of the neutron flow emitted by the core and $\Delta P$ is the additional power resulting from the potential reactivity of the assembly of control bars of the reactor when this assembly passes from the observed insertion to the minimum insertion, $\Delta P$ being calculated by applying the formula:

$$P = \frac{-EG - FP - FT + EG1}{AP}$$

in which EG is the antireactivity resulting from the measured position of the power regulation clusters, involving the axial power distribution measured and the previously defined exhaustion of the core, FP is a first corrective term corresponding to the reactivity effect of the error at real power, such as it is measured, caused by the distortion of the density distribution of the water in the core of the reactor, which is a second degree function of the axial power distortion measured, FT is a second corrective term corresponding to the reactivity effect of the difference between the mean temperature of the core, which is a measured magnitude, and the reference temperature, which is a pre-established magnitude, EG1 is a scale constant for taking into account the fact that it is necessary, at high power, to maintain bars fractionally inserted in the core so as to be able to control the temperature and AP is a term for translating into power variations, the effects calculated in terms of reactivity.

The method of the invention further provides for the first corrective term FP to correspond to the reactivity effect of the difference at real power, such as it is measured, caused by the distortion of the distribution of the water density in the core of the reactor, which is a second degree function of the axial power distortion measured, in accordance with the formula:

$$FP = Prel (p3 + p4.Ao + p5.Ao2),$$

p3, p4 and p5 being constant dimensioning coefficients.

The method of the invention finally provides for the second corrective term FT to correspond to the reactivity effect of the difference between the mean temperature of the core, which is a measured magnitude, and the reference temperature, which is a pre-established magnitude, in accordance with the formula:

$$FT = p6 (Tmoy - ref)$$

p6 being a constant coefficient and Tmoy being the mean temperature of the core of the reactor obtained from the temperatures of the primary circuit at the inlet and at the outlet of the core.

The invention includes the use of the pick-up power to cause a corrective action consisting in modifying the level of the boron in solution in the primary circuit.

BRIEF DESCRIPTION OF THE DRAWINGS

The different objects and features of the invention will now be described in greater detail hereafter with respect to one embodiment of the invention. The description refers to the accompanying single drawing figure which shows schematically a pressurized water nuclear power station.

DESCRIPTION OF THE PREFERRED EMBODIMENT

The drawing shows the core 1 of a pressurized water reactor, associated in a primary circuit 4 with a steam generator 2. The movement of the pressurized water is forced by a primary circuit 3. A pressurizer 4 maintains the volume and the pressure of the water in the primary circuit. These different elements are disposed in an enclosure 1 0 through which pass the pipes of a secondary circuit 12 connected to the steam generator 2. This secondary circuit 12 comprises a turbine 13, driving an alternator 14, a condenser 15 and a secondary pump 16. Valves 19 and 20 make it possible to by-pass the turbine 13 in order to maintain the secondary circuit if driving of the alternator must be interrupted.

As mentioned above, the core of the reactor contains, in a vessel, fuel assemblies formed of fuel rods containing the fissile material; in some of them mobile control rods or bars 20 are inserted containing a neutron absorbing material. The control bars of a fuel assembly, controlled together, form a control cluster. The fuel assemblies are plunged into the pressurized water which flows through the primary circuit 4, which has in fact several primary loops only one of which, shown in the drawing, includes the pressurizer 2. The pressurized water serves as moderating and heat-carrying fluid. Furthermore, it contains boron in solution, a neutron absorbing material serving, like the control clusters, for controlling the operation of the reactor.

The circuits for injecting boron, in the form of boric acid, into the primary circuit 4 have not been shown.

The drawing shows finally, at C1 to C6, ionization chambers disposed in the vicinity of the reactor, outside the vessel, for measuring the neutron flow at different height levels. In practice, these detectors are formed of four individual detectors per level, whose output signals are combined so as to each deliver a signal representative of the instantaneous power emitted by the reactor at the corresponding level.

Moreover, devices for measuring and determining different variables such as the temperature at different points of the primary circuit, the depth of insertion of the control bars, the boron content of the pressurized water in the primary circuit, etc. have not been shown.

Finally, as is well known, the state of the core of the reactor is periodically redefined, by placing the reactor under given operating conditions and then making specific measurements, some of which involve probes introduced into the core at this time.

In operation, the real power of the reactor Prel is expressed in the form of a fraction of the rated power, i.e. of the maximum power anticipated in normal operation of the reactor, for which the insertion of the control bars is minimum. The real power is measured, for example, from the neutron flows indicated by detectors C1 to C6. The axial power distortion, i.e. a value characterizing the asymmetry of the real power distribution, will also be derived from the output signals of these detectors. The position of the control bars is indicated directly by the counter indicating the insertion pitch of the clusters. A reference temperature Tref is defined as a function of the power required at the reactor. A means temperature of the core Tmoy is derived from the temperatures measured in the primary circuit, at the inlet of the pressurized water into the reactor and at its outlet.

In one embodiment of the invention, the term EG results from applying the following formula, in matrix notation:

$$EG = \frac{[Pref][A][Pr]}{[Pref][Pr]}$$

in which [Pref] and [Pf] are vectors representing an axial power distribution, the first periodically redefined in a reference configuration so as to represent the axial exhaustion of the core, whereas the second results from in-line measurements made by the neutron flow detectors.

Both are determined by applying a formula of the type:

$$[P] = [T]^{-1}[S]^{-1}[I]$$

in which [P] is the axial power distribution, [T] is a transfer matrix of the measurement system, [S] is a matrix of sensitivity of the detectors and [I] represents the outputs of the neutron detectors.

The term [A] is a diagonal matrix representing the antireactivity caused by the power control clusters and it is the sum of as many terms $$[A] = C_I[G_I]$$

as there are power control groups, $C_I$ being the integral efficiency of the group, pre-determined or measured beforehand, and $[G_I]$ a position matrix whose terms are defined directly by the position of the control groups indicated by its insertion pitch counter.

The first corrective term FP corresponds to the reactivity effect, at the real measured power, of the distortion of the distribution of the water density in the core of the reactor, which is a second degree function of the axial power distortion measured, in accordance with the formula:

$$FP = Prel\ (p3 + p4.Ao + p5.Ao2),$$

p3, p4 and p5 being constant dimensioning coefficients.

The second corrective term FT corresponds to the reactivity effect of the difference between the mean temperature of the core, which is a measured magnitude, and the reference temperature, which is a pre-established magnitude, in accordance with the formula:

$$FT = p6\ (Tmoy - Tref)$$

p6 being a new constant coefficient and Tmoy being the mean temperature of the core of the reactor obtained from the temperatures of the primary circuit at the inlet and at the outlet of the core.

After these correctives, determination of the potential reactivity of the control bars is of high precision, so that the term EG1 may be a simple scale constant.

The invention also provides for the use of the rapid return to power capacity thus determined and evaluated for initiating, by any means, a corrective action consisting in raising the level of boron in the primary circuit, which will result in a corresponding lowering of the control bars and consequently an increase of the rapid return to power capacity.

I claim:

1. Method of determining and evaluating the capacity of a pressurized water nuclear reactor to return to power rapidly, said method consisting in calculating a pick-up power by applying the general formula:

$$Prip = Prel + \Delta P$$

in which Prip is the maximum pick-up power obtainable by acting on the control bars, Prel is the relative power delivered by the core, determined by the in-line measurement of the neutron flow emitted by the core and $\Delta P$ is the additional power resulting from the potential reactivity of the assembly of control bars of the reactor when this assembly passes from the observed insertion to the minimum insertion, $\Delta P$ being calculated by applying the formula:

$$\Delta P = \frac{-EG - FP - FT + EG1}{AP}$$

in which:

EG is the antireactivity resulting from the measured position of the power regulation clusters, involving the axial power distribution measured and the previously defined exhaustion of the core, FP is a first corrective term corresponding to the reactivity effect of the error at real power, such as it is measured, caused by the distortion of the density distribution of the water in the core of the reactor, which is a second degree function of the axial power distortion measured, FT is a second corrective term corresponding to the reactivity effect of the difference between the mean temperature of the core, which is a measured magnitude, and the reference temperature, which as a pre-established magnitude, EC1 is a scale constant for taking into account the fact that it is necessary, at high power, to maintain bars fractionally inserted in the core so as to be able to control the temperature and AP is a term for translating into power variations, the effects calculated in terms of reactivity.

2. Method according to claim 1, wherein the first corrective term FP corresponds to the reactivity effect of the difference at real power, such as it is measured, caused by the distortion of the distribution of the water density in the core of the reactor, which is a second degree function of the axial power distortion measured, in accordance with the formula:

$$FP = Prel\ (p3 + p4.Ao + p5.Ao2),$$

p3, p4 and p5 being constant dimensioning coefficients.

3. Method according to claim 1, wherein the second corrective term FT corresponds to the reactivity effect of the difference between the mean temperature of the core, which is a measured magnitude, and the reference temperature, which is a pre-established magnitude, in accordance with the formula:

$$FT = p6\ (Tmoy - Tref)$$

p6 being a constant coefficient and Tmoy being the mean temperature of the core of the reactor obtained from the temperatures of the primary circuit at the inlet and at the outlet of the core.

4. Method according to any one of the preceding claims, including that it includes the use of the pick-up power for causing a corrective action consisting in modifying the level of the boron in solution in the primary circuit.

5. Method of determining and evaluating the capacity of a pressurized water nuclear reactor to return to power rapidly, consisting in collecting information as to a temperature and boron content of water of said reactor, a depth of insertion of control rods, neutron flow at various axial levels, axial power distribution, and combining collected information in order to obtain maximum pick-up power obtainable by acting on control bars, said method including the steps of (a) determining as a first term a relative power delivered by a core of said reactor by in-line measurement of neutron flow emitted by said core; and (b) determining as a second term an additional power resulting from potential reactivity of an assembly of said control bars of said reactor when said assembly passes from an observed insertion to a minimum insertion, said second term being obtained through (i) determining as a third term antireactivity resulting from a measured position of power regulation control rod clusters, involving measured axial power distribution and a previously defined exhaustion of the core;

(ii) evaluating a first corrective term corresponding to the reactivity effect of an error at real power, as measured, caused by distortion of a density distribution of said water in said core of the reactor, i.e., a second degree function of measured axial power distribution;

(iii) evaluating a second corrective term corresponding to the reactivity effect of a difference between a measured mean temperature of said core and a predetermined reference temperature;

(iv) establishing a scale constant for taking into account the fact that it is necessary, at high power, to maintain bars fractionally inserted in the core so as to be able to control temperature; and (v) establishing a proportional term for translating into power variations effects calculated in terms of reactivity;

(vi) so as to obtain said second term by subtracting from said third term, which is negative, said first and second corrective terms, and adding said scale constant, the whole result being divided by said proportional term, and so as to obtain said maximum pick-up power by adding said first and second terms.

* * * * *